UNITED STATES PATENT OFFICE.

HENRY L. DOHERTY, OF NEW YORK, N. Y.

PREPARED FUEL FOR GAS-PRODUCERS.

1,150,839.  Specification of Letters Patent.  Patented Aug. 17, 1915.

No Drawing.  Application filed January 17, 1911. Serial No. 603,083.

*To all whom it may concern:*

Be it known that I, HENRY L. DOHERTY, a citizen of the United States, and a resident of New York city, in the county of New York and State of New York, have invented certain new and useful Improvements in Prepared Fuel for Gas-Producers, of which the following is a specification.

This invention relates to a prepared fuel for gas producers.

The object of my invention is to provide a fuel for gas producers which will permit of the operation of the producers without the objectionable formation of clinkers.

Briefly, my invention comprises a prepared fuel for gas producers produced by mixing with the fuel a suitable material which is capable of combining with the ash of the fuel to form an easily fusible compound. The ash, as it is liberated by the combustion of the carbon of the fuel, is thus caused to unite with the flux to form a silicate, fluid at the temperature of the gas producer. This runs down through the interstices of the charge and collects in the bottom of the gas producer, from whence it is tapped off at intervals.

The method of operating gas producers with my prepared fuel, I have described and claimed in my Letters Patent No. 1,069,866, dated Aug. 12, 1913, which application was filed of even date with this, and fully discloses, but does not claim, the invention which is the subject of this present application. The material which I use as a flux and the quantity thereof which I add to the fuel depends entirely upon the composition and quantity of the ash of the fuel. Iron ore, limestone and lime constitute the most generally available materials. Most other substances which are chemically suited for use as fluxes are not available on account of their cost. A cheap and readily procurable material is, of course, essential.

Of the substances mentioned, limestone is the cheapest and the one most generally available. The most serious objection to its use is the fact that it must be rather finely crushed to insure its decomposition to CaO and $CO_2$ during the period in which it is passing through the gas producer. It is practically necessary, under the conditions which must be met, that the limestone should reach the ash-zone of the producer thoroughly calcined. It is also important that the calcined stone or lime should reach the ash-zone in a fairly fine condition to facilitate its reacting with the ash particles. If burned limestone is used to mix with the fuel it can, of course, be readily reduced to the powdered condition by hydrating it, using care to restrict the water to just about the quantity theoretically required, allowing for the portion of the water which is evaporated by the heat of the reaction and lost as steam.

Next to limestone or lime the most available material for use as a flux is iron oxid. In the form of impure iron ores this material may be obtained in many parts of this country, at a cost little in excess of that of mining, since, in modern practice, only the richer iron ores are smelted. As both the ferric and ferrous silicates are usually quite fusible (*e. g.* alomandite and fayalite) such ores provide an easily procurable and satisfactory basic flux. Since this is usually what is required to make the ash of a fuel fusible, in the majority of cases a properly selected iron ore will suffice as a flux without the addition of any other material.

In the majority of cases the infusibility of ash is caused by the presence of an excessive proportion of either alumina or silica. While in some combinations with iron and the alkali or alkaline earth metals, aluminium forms an easily fusible silicate when combined with the proper proportion of silica, all of the simple silicates of aluminium are either infusible or fusible with difficulty. Generally, therefore, the fusibility of a silicate diminishes with the increase in the proportion of the total base furnished by the alumina. Therefore, where the proportion of alumina is unduly high, I add the proper proportion of base ($CaO$ or $Fe_2O_3$) or base and silica to form some easily fusible double silicate of iron and alumina. When the alumina is relatively low and the infusibility of the ash is due simply to an excessive proportion of silica, a small quantity of base alone will usually suffice to furnish the ingredients for the formation of a suitable silicate. It is usually cheaper, however, when iron oxid is the basic flux used to add the oxid in the form of an ordinary impure iron ore even though it contains a considerable proportion of gangue rather than to prepare a pure oxid of iron by some from of concentration. When lime or limestone is used as the flux there is usually no difficulty in obtaining it fairly pure. The increase in the bulk of the mineral matter in the fuel, which is a necessary consequence of my invention, is, in no sense, objectionable by my method of operating a gas producer on the prepared fuel which is the subject of this application, since the ash may be tapped out as frequently as is necessary, without occasioning any interruption in the operation of the producer.

It is obvious that the exact proportion of flux added to the fuel will depend upon the composition of the ash of the fuel and upon the kind and purity of the flux itself. The ash of a Buck Mountain anthracite will have approximately the following composition, viz.:

| | |
|---|---|
| $SiO_2$ | 45.60% |
| $Al_2O_3$ | 42.75% |
| $Fe_2O_3$ | 9.43% |
| $CaO$ | 1.41% |
| $MgO$ | .33% |
| Other ingredients | .48% |

The proportion of ash in the coal would be about 9%. In a ton of coal there would therefore be the following weights of ash forming ingredients, viz.:

| | |
|---|---|
| $SiO_2$ | =82.1 lb. |
| $Al_2O_3$ | =76.9 " |
| $Fe_2O_3$ | =17. " |
| $CaO$ | = 2.5 " |
| $MgO$ | = .6 " |

Estimating the MgO in its equivalent of lime, we can take the lime as 3.3 lb. For forming a silicate of easy fusibility the lime should be at least equal in weight to the alumina, if lime is to be the flux used. Therefore the quantity of lime added should be about 76.9—3.3=73.6 lb. In this case, owing to the abnormally high alumina, there is a deficiency in the proportion of $SiO_2$ also. Therefore, with the lime, I add the proper quantity of silica, as sand, to bring the proportion of silica in the ash mixture up to a weight about equal to the sum of the weights of alumina and lime. Since there are 82.1 lb. of silica already present in the ash, the quantity of sand required would be about (76.9+76.9) minus 82.1=71.7 lb.

It is of course to be understood that I do not limit myself to a fuel prepared with the exact proportions of flux given above. According to my specific invention it is necessary, only, that there be present in the mixture, in available form, a proportion of a basic material other than alumina, at least equivalent in combining power to the alumina present, and a proportion of silica sufficient to establish a mixture of ash-forming ingredients, as the same are liberated by combustion, that will form a cinder liquid below 2600° F. The mineral matter in the ash is thus reduced to a liquid condition as fast as it is formed, with the result that it flows to the hearth of the gas producer, from which it is tapped out at intervals.

Having described my invention, what I claim is:—

1. An artificially prepared fuel formed by adding to natural carbonaceous fuel containing alumina a proportion of a basic material other than alumina at least equivalent in combining power to the alumina present, to establish with the natural ash of the fuel, as the said ash is liberated by combustion, a mixture of ash forming ingredients fusible below 2600° F.

2. An artificially-prepared fuel which is composed of a mixture of coal in major proportion and ash-forming ingredients in minor proportion, the said ash-forming ingredients comprising limestone or lime, and silica in such proportions that the total bases other than alumina will be at least equivalent in combining power to the alumina present, and the total silica sufficient to form a silicate with the bases originally present and those added that will fuse below 2600° F.

3. An artificially-prepared fuel which is composed of a mixture of coal, limestone or lime, iron compounds and silica in such proportions that the mineral constituents added and the ash of the coal as the latter is set free by the combustion of the coal will form a silicate fusible at a temperature below 2600° F.

Signed at New York city in the county of New York and State of New York this 16th day of January A. D. 1911.

HENRY L. DOHERTY.

Witnesses:
J. M. McMILLIN,
F. L. BLACKBURN.